REVERTIVE CALL CIRCUIT

Filed April 6, 1964

INVENTOR.
FRANK R. FAHEY
BY Robert L. Nathans
ATTORNEY

United States Patent Office 3,365,547

Patented Jan. 23, 1968

3,365,547

REVERTIVE CALL CIRCUIT

Frank R. Fahey, Rochester, N.Y., assignor, by mesne assignments, to Stromberg-Carlson Corporation, Rochester, N.Y., a corporation of Delaware Filed Apr. 6, 1964, Ser. No. 357,446

4 Claims. (Cl. 179—17)

ABSTRACT OF THE DISCLOSURE

A revertive call circuit including means for detecting a partially built-up revertive call code impulsed into a register sender causing the time-divided inpulsing bus to be coupled to the time-divided outpulsing bus of the register sender applying the remaining impulses of the digits of the revertive call code to step the first selector to connect the revertive call selector in the switch train.

The present invention relates to revertive call circuitry.

As is well known in the art of telephony, a revertive call differs from an ordinary call in that the calling party generally hangs up upon completion of dialing and waits until ringing of the calling and called parties' subsets is tripped by the called party going off-hook. The calling party thereafter again goes off-hook and both parties are connected together across the common line circuit. A special revertive call selector is utilized in the handling of this type of call, to prevent the switch train from being released when the calling party hangs up.

In a typical prior art arrangement, a revertive call code (e.g., 19) is dialed by the calling party followed by digits (XX) identifying the called party. The revertive call code is translated into a digit (e.g., 4) which is outpulsed from a register sender and which steps a first selector to a particular level in its associated wire bank to connect the first selector to the revertive call selector. The digits XX which were impulsed into the register sender are thereafter outpulsed from the sender to complete the connection. However, if the calling party hangs up almost immediately after dialing the second X digit, a general purpose register sender could be cleared before the X digits are completely outpulsed and as a result an erroneous connection would be set up due to the resulting mutilation of the X digits. In addition, it is economically desirable to eliminate translation and outpulsing circuitry for effecting the aforesaid outpulsing of the digit 4 to step the first selector.

Accordingly, the principal object of the present invention is to provide new and improved revertive call circuitry.

It is a further object of the present invention to provide new and improved revertive call circuitry which eliminates means for translating a revertive call code into a number which is outpulsed to cause the first selector to select a revertive call selector.

It is a further object of the present invention to provide new and improved revertive call circuitry which eliminates the possibility of digit mutilation in connection with the placing of a revertive call with equipment using a high speed register sender.

Figure 1:
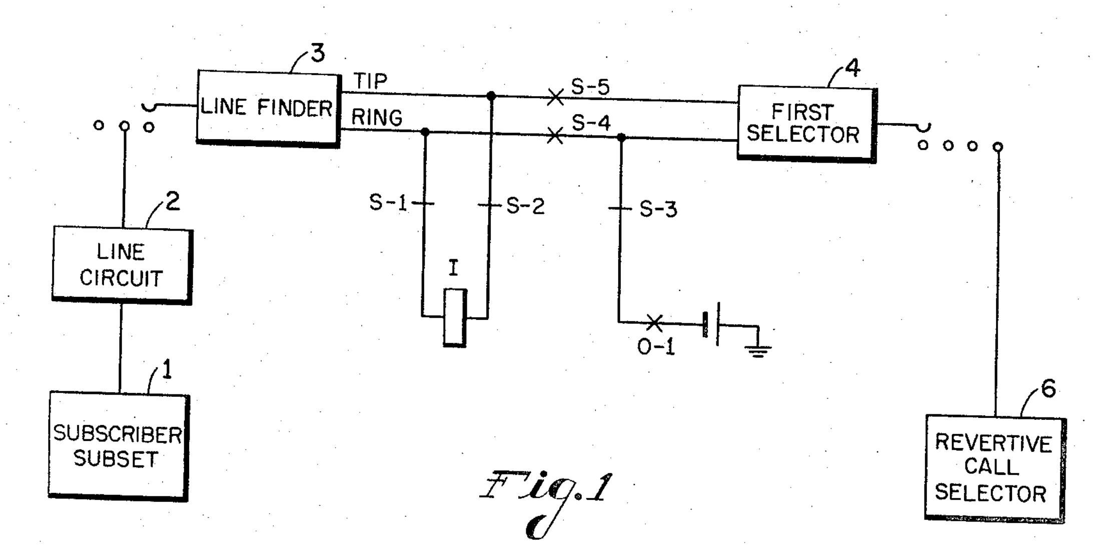
Figure 2:
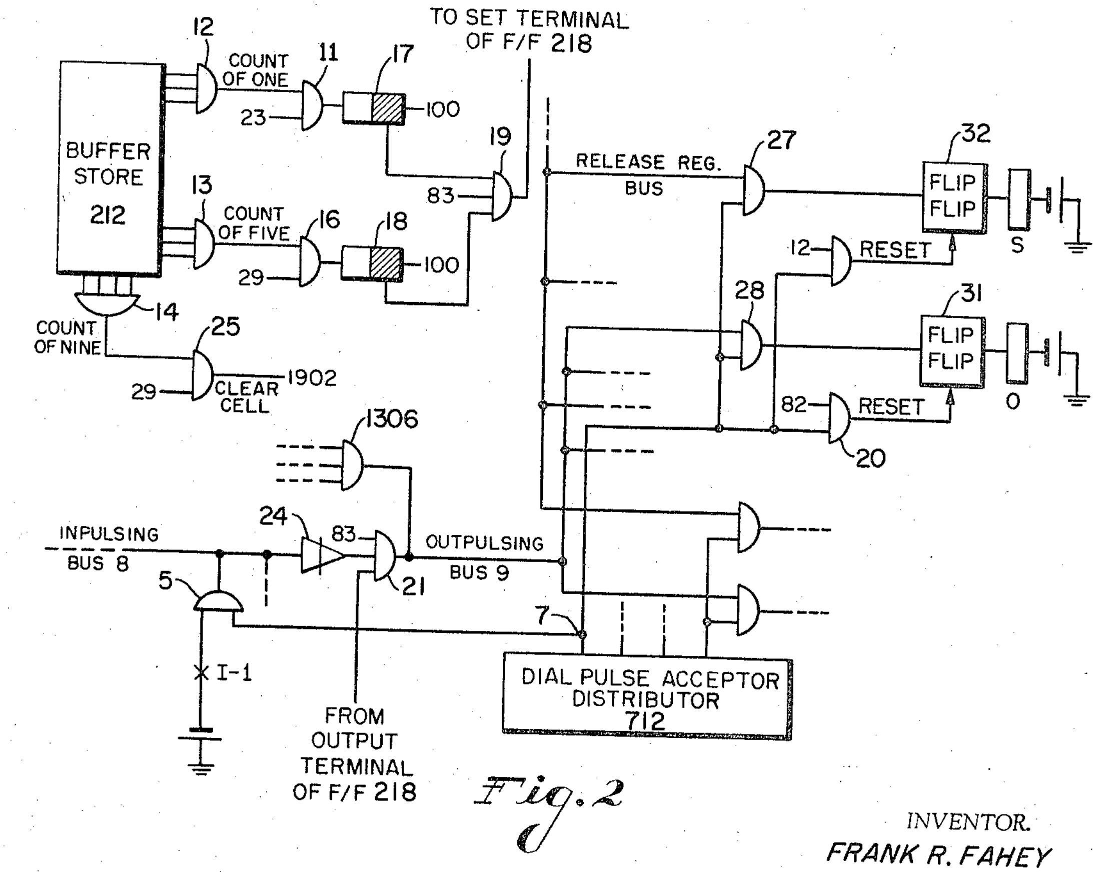

Further objects and advantages of the invention will become apparent as the following description proceeds, and the features of novelty which characterize the invention will be pointed out with particularity in the accompanying drawings illustrating one embodiment of the present invention, and wherein:

FIGURE 1 is a schematic block diagram of a conventional switch train within a step-by-step telephone exchange including certain features of the present invention; and FIGURE 2 is a schematic circuit diagram of one embodiment of the present invention.

In accordance with the present invention, the aforesaid possible digit mutilation and revertive code translation and outpulsing circuitry are eliminated by providing means for detecting a first group of impulses forming a partially built-up revertive call code of two digits (e.g., 15) impulsed into the register sender, which code indicates that in all probability a revertive call code (e.g., 19) will be dialed (15, 16, 17 and 18 are unassigned). The detection of the partially built-up revertive call code causes the time-divided register sender impulsing bus to be coupled in an appropriate subframe to the time-divided outpulsing bus of the register sender in a few milliseconds, so that the remaining four impulses which will, in all probability, be dialed by the calling party will directly step the first selector to connect the revertive call selector in the switch train. The remaining dialed digits (XX) forming a second group of impulses complete the revertive call connection through the revertive call selector, as is well known. In the event that an unassigned number (e.g., 16) is in fact dialed, such is detected after the third digit is entered into the register sender by the register sender translator and the call is routed to intercept or dropped.

The disclosed circuitry illustrating the present invention operates in conjunction with the electronic register sender disclosed in United States patent application Ser. No. 300,577, filed Aug. 7, 1963, by James Gordon Pearce and Allan Curtis Tetrault, now Patent No. 3,312,786, which application is assigned to the same assignee as the present invention. Patent application Ser. No. 300,557 is hereby incorporated by reference into this application.

Certain components in FIG. 2 have been labeled by means of three or four digit numbers. These components are similarly labeled in the aforesaid patent application. Dial pulse acceptor distributor 712 is found in FIG. 7, while "normal" outpulsing AND gate 1306 is found in FIG. 13 of the aforesaid patent application. The output terminal of AND gate 20 is designated as 1902 which means that this terminal is connected to conductor 1902 in FIG. 19. The inpulsing, outpulsing, and release register time-divided busses are also disclosed in the aforesaid patent application.

For the purpose of understanding the present invention, one need not study the details of the electronic register sender, if one keeps in mind its basic overall operation. The electronic register sender of the aforesaid patent application sequentially receives information over an inpulsing bus from twenty-five inpulsing relays which are sequentially commutated with the inpulsing bus. Subscriber dialing data which is forwarded to the register sender via these inpulsing relays is built up within the register sender in various recirculating stores (subcells), groups of which are associated with particular recirculating cells. The inpulsed numbers may be translated into other numbers which are outpulsed on a time-divided outpulsing bus which is coupled to a distributor which distributes the outpulsed time-divided information to the appropriate space-divided electromechanical circuits which in turn are utilized to forward the impulses to first selectors. Generally speaking, the inpulsing bus is not coupled to the outpulsing bus, because inpulsed data is to be either translated into other data by the register sender or outpulsed at a later time via normal outpulsing gate 1306, after various translated routing digits are outpulsed to the aforesaid first selectors.

FIG. 1 discloses a conventional switch train within a step-by-step telephone exchange comprising subscriber subset 1, line circuit 2, line finder 3, first selector 4, and revertive call selector 6. The electromechanical circuitry disclosed in FIG. 1, situated between line finder 3 and first selector 4, enables the register sender to handle directive information which would otherwise be transmitted from line finder 3 directly to first selector 4. Inpulsing into the register sender is facilitated by the operation of inpulsing relay I in FIG. 1, since contacts S–1 and S–2 are normally closed. As the frame rate of the electronic register sender is 2500 microseconds and since twenty-five recirculating cells of one hundred microseconds are utilized to handle twenty-five simultaneous calling line circuits, it follows that conductor 7 which is connected to one of twenty-five output terminals of distributor 712 will be marked for the one hundred microsecond period every 2500 microseconds. Contact I–1 of FIG. 2 closes in response to the receipt of a mark upon the time-divided inpulsing bus when inpulsing relay I is operated, or, in other words, when subscriber subset 1 is off-hook. The first dialed impulse is thereafter characterized as an on-hook condition. It should now be apparent that the register sender may receive and count inpulses from twenty-five pulsing relays I which time-share the inpulsing but disclosed in FIG. 2. It should be noted that during inpulsing, contacts S–4 and S–5 are open so that the register sender receives the dialed impulses and none of these impulses are generally forwarded to first selector 4. After inpulsing and translation, the routing digits are impressed upon the TDM outpulsing bus 9 to be distributed to appropriate outpulsing relays, each outpulsing relay being located within one of twenty-five dial pulse acceptors. In other words, a single time-divided electronic register sender could simultaneously receive and count impulses from twenty-five line circuits via the time-divided inpulsing bus and, in like manner, simultaneously outpulse via the single TDM outpulsing bus dial impulses to twenty-five outpulsing relays which control the stepping of outgoing switch trains. However, it should be understood that the inpulsing bus 8 and outpulsing bus 9, owing to the general mode of operation set forth hereinabove, are not coupled together during subframes of the TDM cycle.

As explained in the aforesaid patent application, buffer store 212 is merely a bank of bistable elements which will be set at different times to the binary numbers contained within all of the recirculating cells and subcells. Upon the inspection of FIG. 1B of the aforesaid patent application, and as further explained therein, the binary number contained within the first digit store (subcells 23–26) will indicate the number of dialed impulses making up the first dialed digit. The timing bit generator disclosed in FIG. 6 of the aforesaid patent application goes through an entire cycle every one hundred microseconds, thereby to sequentially mark a large plurality of output terminals which are numbered as disclosed in FIG. 6. In the aforesaid patent application, a large number of AND gate input terminals are given numbers ranging from 4 to 98. AND gate 11 of FIG. 2 is similarly marked, which means that this AND gate input terminal 23 is connected to output terminal 23 of the timing bit generator of FIG. 6, which will be marked for one microsecond every one hundred microseconds when the twenty-third subcell is occupying the right-hand flip-flop 218 of buffer store 212. In other words, the marking of AND gate 11 occurs for one microsecond during the twenty-third subinterval for each recirculating cell. It should be understood that each group of subcells of each recirculating cell, defined by the brackets of FIG. 1B, occupy buffer store 212 during the bracketed subintervals. For example, the contents of the first digit store (subcells 23–26) will be statically retained by buffer store 212 during subintervals 23–26. Similarly, the contents of the second digit store (subcells 28–31) will be statically retained within buffer store 212 during subintervals 28–31 for each recirculating cell to emerge from the main delay line store 410. FIG. 2A of the aforesaid patent application discloses various three and four input terminal AND gates, whose input terminals are coupled to the various output terminals of the flip-flops of buffer store 212 in various combinations.

A "count of zero" AND gate will have its output terminal marked only when a binary "count of zero" is contained within buffer store 212, because the input terminals of the "count of zero" AND gate are coupled to the not 1, not 2, not 4 and not 8 output terminals of these flip-flops. Similarly, "count of one" AND gate 12 of FIG. 2 of this application will have its input terminals coupled to the 1, not 2 and not 4 output terminals of the flip-flops of the buffer store; and, in like manner, "count of five" AND gate 13 will have its input terminals coupled to the 1, not 2 and 4 output terminals of the buffer store flip-flops. Accordingly, the output terminal of AND gate 12 will be marked when a "count of one" is contained within buffer store 212, while the output terminal of AND gate 13 will be marked when a "count of five" is contained within buffer store 212. Likewise, the output terminal of AND gate 14 will be marked when a "count of nine" is contained within buffer store 212. Since subcells 23–26, which define the first digit store, are present in buffer store 212 during the twenty-third through the twenty-sixth subinterval, the output terminal of AND gate 11 will be marked when a "count of one" is detected within the first digit store. Likewise, the output terminal of AND gate 16 will be marked when a "count of five" is detected within the second digit store, since this AND gate is enabled during the twenty-ninth subinterval for each recirculating cell. As discussed hereinabove, the manifestation of a 15 signifies the strong probability that a 19 revertive call code will be dialed and therefore, in accordance with the present invention, it is desired to cause the following four digit impulses to be switched through, that is, directly step first selector 4 so as to select revertive call selector 6. The "count of five" will be manifested within buffer store 212 after the occurrence of the trailing edge of the fifth dial pulse of the second digit (on-hook to off-hook). Since the leading edge of the next impulse will not occur for at least another forty milliseconds, this period is utilized to effect the aforesaid switchthrough so that the sixth impulse will start stepping first selector 4. The first step in establishing switchthrough is to mark a particular subcell, such as subcell 83, which will be designated as a switchthrough subcell. Two and one-half milliseconds or one frame period later this marked switchthrough subcell is detected, and will be utilized to cause the inpulsing bus to be coupled to the outpulsing bus so that the sixth through the ninth dialed impulse manifested on the inpulsing bus will be directly manifested on the outpulsing bus which in turn will cause the operation of an outpulsing relay to directly step first selector 4.

More specifically, the detection of 15 within the first and second digit stores causes the setting of flip-flops 17 and 18 during the twenty-third and twenty-ninth subintervals, respectively, which in turn causes AND gate 19 to be partially enabled and remain enabled until the one hundredth subinterval which marks the resetting of these flip-flops and the handling of the next cell by the register sender. Since the third input terminal of AND gate 19 is labeled 83, the output terminal of AND gate 19 will be marked during subinterval 83 if, and only if, a 15 is detected. The output terminal of AND gate 19 is connected to the set terminal of flip-flop 218 thereby to cause the switchthrough subcell 83 to be marked since subcell 83 "occupies" this particular flip-flop during the eighty-third subinterval. Two and one-half milliseconds later, switchthrough subcell 83 of this particular cell will cause flip-flop 218 to become set thereby to mark the lower input terminal of AND gate 21. The upper input terminal of AND gate 21 is connected to the timing bit generator to partially enable AND gate 21 during the eighty-third subinterval so that AND gate 21 is "reading" subcell 83, rather than some other subcell such as 78 or 23. Since the leading edge of an impulse is characterized by the off-hook to on-hook condition, the detection of an on-hook condition on inpulsing bus 8, after switchthrough bit 83 is marked, will indicate the presence of the sixth dialed impulse. However, since the on-hook condition is manifested by a "no mark" on inpulsing bus 8, inverter 24 is provided so that outpulsing bus 9 is marked by the presence of the "no mark" dialed impulse condition on inpulsing bus 8.

In summary, the detection of a dialed 15 causes a switch-through bit to become marked, which mark is detected 2.5 milliseconds later so as to cause the "no mark" (dialed impulse) condition on impulsing bus 8 to mark outpulsing bus 9. Consequently, a series of one micro-second impulses separated by a period of two and one-half milliseconds will be impressed upon outpulsing bus 9 as long as a dialed impulse is present on inpulsing bus 8, for any particular cell. Since outpulsing bus 9 is time divided among twenty-five sets of electromechanical circuitry, each of which is interposed between a line finder and a first selector, outpulsing bus 9 is coupled to the circuits through a distributor. AND gates 27 and 28 are enabled by dial pulse acceptor distributor 712 for the aforesaid one hundred microsecond interval every 2.5 milliseconds so that the time-divided information on outpulsing bus 9 will step the proper electromechanical equipment. It will be assumed that the electromechanical equipment shown in FIG. 1 is assigned to the first cell so that the first output terminal 7 of dial pulse acceptor distributor 712 simultaneously enables inpulsing AND gate 5 together with outpulsing AND gates 27 and 28. In other words, the marking of output terminal 7 defines the first one hundred microsecond interval within each 2.5 millisecond frame. The one microsecond impulses manifested on outpulsing bus 9 during the sixth impulse of the second digit pass through AND gate 28 to operate flip-flip 31 which in turn controls the operation of the O-relay. The trailing edge of each one microsecond impulse sets flip-flip 31 to complete the energizing circuit of the O-relay thereby to operate it. The flip-flip remains set or operated for almost an entire frame period until a reset pulse passes through gate 20 during subinterval 82 to reset the flip-flip. The relay remains operated as long as the aforesaid pulse train passes through gate 28, although its ground circuit may be broken for a few microseconds. During each frame, of course, a monostable multivibrator or an integrator-amplifier combination could be used in place of the flip-flip arrangement.

Accordingly, relay O will remain operated during the manifestation of each dialed impulse of the second digit after the fifth impulse and will be deenergized between these dialed impulses. The energization of the O-relay causes the closure of contact O–1 which in turn causes first selector 4 to be stepped once for each dialed impulse. Therefore, it should be apparent that after the manifestation of a 15 in the first and second digit stores, the further receipt of the four remaining impulses is utilized to directly step first selector 4. Accordingly, the dialing of a one followed by a nine will cause the revertive call selector to be connected in the switch train so that the remaining dialed digits (XX) may complete the connection. As a result the aforesaid possibility of digit multilation of the XX digits is avoided since these digits are not outpulsed from the register sender but are utilized to directly operate the revertive call selector. In addition, translating and outpulsing within the register sender itself is avoided.

The sixth through ninth impulses of the second digit are nevertheless impressed upon inpulsing bus 8 so that when the revertive call selector 6 is reached by first selector 4 a "count of nine" within the second digit store is detected by AND gate 25 which in turn causes the particular cell associated with the described call to be cleared thereby to dismiss the register sender which is no longer needed. The marking of conductor 1902 of FIG. 19 of the aforesaid patent application causes the cell to be cleared, as explained in that application. This process causes the release register bus to be marked during the thirteenth subinterval to indicate clearance. Since the release register bus is coupled to relay S through flip-flip

32 and AND gate 27, relay S will become operated and will remain operated as long as the cell remains cleared. The operation of relay S causes contacts S–4 and S–5 of FIG. 1 to be closed, thereby to directly connect the line finder to the first selector. Contacts S–1 and S–2 will be opened at this time so as to disconnect the line finder from the inpulsing relay. S–3 is also opened since outpulsing is no longer required.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In a telephone system, a source of directive information for transmitting a first group of impulses having a first count indicative of a revertive call and for thereafter transmitting a second group of impulses indicative of the routing of said revertive call, a first selector, a revertive call selector, means for counting said first group of impulses, means for detecting a second count registered within said means for counting having a value which is less than said first count and which second count is indicative of the receipt of some of said impulses of said first group by said means for counting, means responsive to the detection of said second count by said means for detecting for causing said first selector to be actuated by the remaining impulses of said first group of impulses and for causing in turn said revertive call selector to be coupled to said source of directive information through said first selector so that said second group of impulses may complete the setting up of said revertive call through said revertive call selector.

2. In a telephone system, a source of directive information for transmitting a first group of impulses having a first count indicative of a revertive call and for thereafter transmitting a second group of impulses indicative of the routing of said revertive call, a first selector, a revertive call selector, means for counting said first group of impulses, means for detecting a second count registered within said means for counting having a value which is less than said first count and which second count is indicative of the receipt of some of said impulses of said first group by said means for counting, means responsive to the detection of said second count by said means for detecting for causing said first selector to be actuated by at least some of the remaining impulses of said first group of impulses and for causing in turn said revertive call selector to be coupled to said source of directive information through said first selector so that said second group of impulses may complete the setting up of said revertive call through said revertive call selector.

3. Remote control equipment comprising a plurality of units to be selectively seized by said equipment, a source of directive information for transmitting a first group of impulses having a first count and for thereafter transmitting a second group of impulses, a first selector, a second selector, means for counting said first group of impulses, means for detecting a second count registered within said means for counting having a value which is less than said first count and which second count is indicative of the receipt of some of said impulses of said first group by said means for counting, means responsive to the detection of said second count by said means for detecting for causing said first selector to be actuated by the remaining impulses of said first group of impulses and for causing in turn said second selector to be coupled to said source of directive information through said first selector so that said second group of impulses may actuate said second selector to cause the seizure of at least one of said plurality of units.

4. Remote control equipment comprising a plurality of units to be selectively seized by said equipment, a source of directive information for transmitting a first group of impulses having a first count and for thereafter transmitting a second group of impulses, a first selector, a second selector, means for counting said first group of impulses, means for detecting a second count registered within said means for counting having a value which is less than said first count and which second count is indicative of the receipt of some of said impulses of said first group by said means for counting, means responsive to the detection of said second count by said means for detecting for causing said first selector to be actuated by at least some of the remaining impulses of said first group of impulses and for causing in turn said second selector to be coupled to said source of directive information through said first selector so that second group of impulses may actuate said second selector to cause the seizure of at least one of said plurality of units.

No references cited.

WILLIAM C. COOPER, *Primary Examiner.*